United States Patent [19]

Ferguson

[11] 4,328,034
[45] May 4, 1982

[54] FOAM COMPOSITION AND PROCESS

[76] Inventor: Charles N. Ferguson, 1623 "X" St., Dallas, Tex. 75220

[21] Appl. No.: 152,994

[22] Filed: May 27, 1980

[51] Int. Cl.³ .............................................. C04B 31/00
[52] U.S. Cl. ..................................................... 106/75
[58] Field of Search ................................. 106/40 R, 75

[56] References Cited

U.S. PATENT DOCUMENTS

| 3,136,645 | 6/1964 | Dess | 106/75 |
| 3,148,996 | 9/1964 | Vukasovich et al. | 106/86 |
| 3,150,988 | 9/1964 | Dess et al. | 106/75 |
| 3,466,221 | 9/1969 | Sams et al. | 106/40 R |
| 3,625,723 | 12/1971 | Sicka | 106/86 |

*Primary Examiner*—James Poer
*Attorney, Agent, or Firm*—Gerald G. Crutsinger; John F. Booth; Monty L. Ross

[57] ABSTRACT

Improved mineral foam compositions comprising liquid sodium silicate, an alkali metal hydroxide, a filler material selected from fly ash, pozzolan, or mixtures thereof, and silicon. A process for making the subject compositions is also provided.

18 Claims, No Drawings

FOAM COMPOSITION AND PROCESS

TECHNICAL FIELD

This invention relates to mineral foam compositions and to a process for their preparation. One aspect of the invention relates to a lightweight and economical mineral foam composition containing a filler material selected from fly ash, pozzolan, or mixtures thereof. Another aspect of the invention relates to an improved mineral foam composition comprising sodium silicate, an alkali metal hydroxide, a filler material selected from fly ash or pozzolan, and silicon that is useful as a building material in view of its relatively low cost, outstanding insulative properties and resistance to melting or burning when subjected to an open flame.

BACKGROUND OF THE INVENTION

Strong and lightweight building materials that are both easily and economically manufactured have long been sought by those working in the building and construction trades. Because of their excellent resistance to heat transfer, fire, weathering, and the like, in addition to their strength and low density, mineral foams have proven to be particularly desirable and useful in building applications. These foamed compositions are referred to generally in the art as foamed ceramics, foamed refractories or mineral foams and are characterized by their ability to set or harden into a rigid mass once they have been expanded by gas bubbles that are generated either internally or externally with or without the addition of heat. Such compositions are disclosed, for example, in U.S. Pat. Nos. 3,136,645 to Dess; 3,148,996 to Vukasovich, et al; 3,150,988 to Dess et al; and 3,625,723 to Sicka.

Nevertheless, such references have required the use of acidic phosphates, fluosilicates, organic surfactants, emulsifiers, and the like to achieve the fluidity and foaming characteristics. In most applications, mineral foam compositions are pumped or poured into forms, or sprayed onto a supporting surface, and are thereafter either permitted or caused through the addition of heat to expand and solidify. Satisfactory mineral foam compositions for use in the building and construction industry should be fluid enough to facilitate emplacement and expansion, yet thick enough to resist over-expansion and to form a strong and insulative mass when set. An improved foam composition is needed that achieves these desirable results without the use of phosphates, fluosilicates, organic surfactants, or emulsifiers.

Furthermore, while the use of acid treated silicon as a foaming agent has been previously disclosed, a process is needed for employing silicon in mineral foam compositions without requiring prior acid treatment to remove any oxides that may be present.

Because it is expected that mineral foam compositions will be made and used over a wide range of ambient temperatures, depending upon the location, climate, season, etc., attendant at any particular construction site, compositions and processes are also needed that are not appreciably affected by temperature variations that might normally be encountered.

SUMMARY OF THE INVENTION

According to the present invention, mineral foam compositions are provided that comprise sodium silicate, an alkali metal hydroxide, a filler material such as fly ash or pozzolan, and silicon. According to a preferred embodiment of the invention, the subject compositions comprise a dilute aqueous solution of sodium silicate having a gravity ranging from about 10 to about 40° Be., and most preferably, from about 20 to about 25° Be.; from about 0.01 to about 0.1 kilograms alkali metal hydroxide per liter of dilute aqueous sodium silicate solution; from about 1 to about 3.3 kilograms of filler material per liter of dilute aqueous sodium silicate solution having the alkali metal hydroxide solubilized therein; and silicon in an amount such that the ratio of silicon to filler material ranges from about 1:50 to about 1:10 by weight. According to another preferred embodiment of the invention, the filler material employed in the above mentioned composition is fly ash or pozzolan having a calcium oxide content ranging from about 10 to about 30 weight percent of the filler material.

According to another embodiment of the invention, an improved process is provided for making mineral foam compositions comprising the steps of diluting commercially available aqueous sodium silicate to a gravity ranging from about 10 to about 40° Be., and preferably from about 20 to about 25° Be.; solubilizing an alkali metal hydroxide in the diluted sodium silicate solution; admixing a filler material preferably selected from the group consisting of fly ash and pozzolan therewith to form a thickened fluid; admixing silicon with the thickened fluid thus formed to initiate foaming; distributing the foaming thickened fluid at the point of use; and thereafter permitting the foaming thickened fluid to expand and set into a hardened mineral foam composition.

The novel compositions disclosed herein exhibit outstanding insulative properties and resistance to melting or burning when subjected to an open flame. Also, their comparatively low densities and good compressive strengths make the subject compositions well suited for use in structural applications such as building blocks, wall panels, columns, and the like. Furthermore, because of their ability to bond directly to metal, the subject compositions are particularly suitable for use as protective coatings for metal structural members of buildings in the event of fire.

Moreover, unlike the materials taught by the prior art, the mineral foam compositions disclosed herein do not require the use of phosphates or organic emulsifiers; neither do they require that the silicon be treated with acid prior to use to remove any oxides that may be present. The present compositions are made without the use of an external heat source, and their formation is not appreciably affected by ambient temperatures ranging from about 0 to about 100° F.

DETAILED DESCRIPTION OF THE PREFERRED EMBODIMENTS

The compositions of the invention generally comprise aqueous sodium silicate, an alkali metal hydroxide, a filler material, and silicon. More particularly, the mineral foam compositions of the invention comprise a dilute aqueous sodium silicate having a gravity ranging from about 10 to about 40° Be., and most preferably from about 20 to about 25° Be.; from about 0.01 to about 0.1 kilograms of an alkali metal hydroxide per liter of dilute aqueous sodium silicate; from about 1 to about 3.3 kilograms of filler material preferably selected from fly ash or pozzolan, containing up to about 30 weight percent lime, per liter of dilute aqueous sodium silicate having the alkali metal hydroxide solubilized therein;

and silicon in an amount such that the ratio of silicon to filler material ranges from about 1:50 to 1:10 by weight. Satisfactory results have been achieved by using fly ash containing up to about 10 weight percent lime. It is understood that fly ashes having higher lime contents are not necessary for practicing the present invention. Furthermore, in many cases such fly ashes may be more expensive to obtain, and therefore less desirable from an economic standpoint.

In making the preferred mineral foam compositions of the invention, surprising and unexpected results have been achieved by employing an aqueous sodium silicate having a specific gravity ranging from about 10 to about 40° Be., and most preferably, from about 20 to about 25° Be. Compositions employing aqueous sodium silicate solutions having gravities less than about 10° Be. tend to be very weak and to overexpand when foamed; aqueous sodium silicate solutions having specific gravities of about 40° Be. or greater tend to be overly thick and resistant to foaming. The preferred aqueous sodium silicate solutions for use in the compositions of the invention have specific gravities ranging from about 20 to about 25° Be. Because this preferred range is lower than the gravity of most commercially available liquid sodium silicates, it has been necessary to dilute the commercially available product with water for use in the invention. Satisfactory results have been achieved in this regard by diluting GRADE 40 liquid sodium silicate having a specific gravity at 20° C. of 41.5° Be. with 1.5 liters of water per liter of GRADE 40. When diluted in this manner, the specific gravity of the resulting dilute aqueous sodium silicate solution is approximately 20° Be. (GRADE 40 is a commercially available liquid sodium silicate having a weight ratio of $Na_2O$: 3.22 $SiO_2$, a solids content of 38.3 percent, and a weight of 11.67 pounds per gallon that is manufactured by Diamond Shamrock Corporation of Dallas, Tex.)

The subject compositions further comprise from about 0.01 to about 0.1 kilograms of an alkali metal hydroxide per liter of dilute aqueous sodium silicate solution. Preferred alkali metal hydroxides for use in the invention are sodium hydroxide and potassium hydroxide, with potassium hydroxide being the most preferred. The amount of alkali metal hydroxide required for a particular application depends in part on the amount and composition of the filler material employed therewith. In general, the alkali metal hydroxide is believed to function as a wetting agent and the preferred amount for use in the subject compositions varies directly according to the total calcium oxide content of the filler material employed therewith. Alkali metal hydroxides are readily soluble in water, and are easily solubilized in the dilute aqueous sodium silicate solutions disclosed above when added thereto in a commercially available pellet form.

The novel mineral foam compositions of the invention further comprise from about 1 to about 3.3 kilograms of filler material per liter of dilute aqueous sodium silicate having the alkali metal hydroxide solubilized therein. Filler materials for use in the subject compositions are preferably selected from fly ash or pozzolan having a calcium oxide content ranging up to about 30 percent by weight. As used herein, the term "fly ash" is intended to indicate the finely divided ash residue produced by the combustion of pulverized coal, which ash is carried off with the gases exhausted from the furnace in which the coal is burned and which is collected from these gases usually by means of suitable precipitation apparatus such as electrostatic precipitators. Those finely pulverized ashes resulting from combustion of coal and from combustion of waste materials in a large incinerator can also be utilized in the compositions disclosed herein providing their chemical compositions are reasonably similar to pulverized coal fly ashes. The term "pozzolan" as used herein refers to materials which are ordinarily of volcanic origin and which in the presence of alkaline earth oxides and moisture enter into a slow reaction causing the growth of strength bonds throughout the mass. Almost the same results are achieved when using soil or beach sand in place of fly ash; therefore, calcium oxide is not the reason for strength. The amount of aqueous sodium silicate desirable for use in a given situation will depend upon the calcium oxide content of the filler, with 1 kilograms of filler per liter of dilute aqueous sodium silicate solution having the alkali metal hydroxide solubilized therein corresponding to the filler having a relatively high calcium oxide content, and a concentration of 3.3 kilograms of filler per liter corresponding to a filler material having a relatively low calcium oxide content. Furthermore, it is generally found that the calcium oxide content of fly ash is higher than that found in pozzolans, and this factor must be taken into effect in formulating the compositions of the invention.

Although the filler materials set forth above are most preferred for use in the compositions and processes of the invention, satisfactory results have also been achieved in some cases through the use of other filler material such as beach sand, soil, and the like. When other filler materials are employed in place of the preferred materials, it may be necessary to further adjust the relative proportions of the other ingredients somewhat, depending upon the makeup of the particular filler of mixture of fillers used. Furthermore, it is understood that the mechanical properties of the resultant product can vary when the compositional parameters deviate significantly from those set forth above.

According to a preferred embodiment of the invention, the mineral foam compositions disclosed herein further comprise silicon. The ratio of silicon to filler material preferably ranges from about 1:50 to about 1:10 by weight. Silicon acts as the foaming agent of the compositions, reacting with the solubilized alkali metal hydroxide and thereby generating hydrogen gas. Because the expansion of the mineral foam is directly proportional to both the amount of gas generated and the resistance exerted against the mineral foam during expansion, the quantity of silicon desirable for a particular formulation will necessarily depend upon the degree of expansion desired and the geometry of the structure in, on, or around which the expanding mineral foam is distributed. Thus, where the expanding mineral foam composition is distributed within a container or foam having a high surface area to volume ratio, more silicon is required to achieve the same degree of expansion than would be necessary, for example, where the composition was distributed by spraying it on a substantially planar surface. A preferred silicon for use in the compositions of the invention is a commercially available powdered silicon having a purity of about 97% or above.

According to another embodiment of the invention, an improved process is disclosed for making a mineral foam composition, said process comprising the steps of diluting a commercially available aqueous sodium silicate with water to produce a solution having a specific gravity ranging from about 10 to about 40° Be., and preferably from about 20 to about 25° Be.; solubilizing an alkali metal hydroxide in the dilute sodium silicate solution; thoroughly admixing a filler material with the dilute sodium silicate solution having the alkali metal hydroxide solubilized therein to form a substantially uniform thickened fluid; admixing silicon with the thickened fluid thus formed to initiate foaming; distributing the foaming thickened fluid at the point of use; and thereafter permitting the foaming thickened fluid to expand and set into a hardened mineral foam composition. Ingredients and/or components disclosed for use in the compositions of the invention previously described are similarly useful in the present process when employed according to the ranges and considerations set forth above.

According to a particularly preferred embodiment of the invention, a process is disclosed for making an improved mineral foam composition, which process comprises the steps of diluting a commercially available aqueous sodium silicate with water to a specific gravity ranging from about 20 to about 25° Be.; solubilizing an alkali metal hydroxide selected from the group consisting of sodium hydroxide and potassium hydroxide in the dilute sodium silicate solution previously formed; admixing a filler material selected from the group consisting of sodium hydroxide and potassium hydroxide in the dilute sodium silicate solution previously formed; admixing a filler material selected from the group consisting of fly ash, pozzolan, and mixtures thereof with the dilute sodium silicate solution having the alkali metal hydroxide solubilized therein to form a thickened fluid, said filler material comprising from about 10 to about 30 weight percent calcium oxide; admixing silicon with the thickened fluid thus formed to initiate foaming; distributing the foaming thickened fluid at the point of use; and thereafter permitting the foaming thickened fluid to expand and set into a hardened mineral foam composition.

Methods of distributing the foaming thickened fluid at the point of use can include, for example, pouring or pumping the fluid into a container or form, or spraying the fluid onto a supporting structure, or any other method of distribution known to those of ordinary skill in the art. When mineral foam compositions are made according to the process set forth above, expansion of the mineral foam is believed to result from the reaction of silicon with the aqueous solution of alkali metal hydroxide, thereby generating hydrogen gas. Because this reaction is exothermic, the temperature of the expanding foam composition is significantly increased, and water vapor or steam is driven from the composition together with some escaping hydrogen gas. While it is well known that hydrogen can be highly explosive when combined with oxygen or air, the wet gas liberated from the compositions produced according to the formulations and process disclosed herein is not believed to present an explosion hazard, and in fact burns with a low flame when ignited.

The aqueous sodium silicate, as used in the disclosed process, aids in retaining the gas bubbles generated within the composition without overly limiting expansion. Then, once expansion is complete, the bonding properties of the sodium silicate are believed to contribute substantially in achieving a preliminary "set" that will, for example, permit forms to be stripped away from the expanded material. Where the mineral foam compositions have, either through overexpansion or through excessive application, exceeded the boundaries of the forms or containers into which they are poured, excess material can be easily trimmed away by means of a common hand saw or the like.

Compositions made according to the specifications disclosed herein exhibit excellent fire resistance and have been found to withstand the tip flame of an oxyacetylene torch (approximately 5000° F.) without ignition or melting. The thermal insulative properties of the compositions are also good, with R values of up to about 1.5 or higher. The densities of the subject mineral foam compositions typically range from about 18 to about 20 pounds per cubic foot and demonstrate compressive strengths ranging from 100 pounds per square inch upwards to about 150 pounds per square inch or more.

While the foregoing compositions and processes have been described in relation to their preferred embodiments, it will be understood that certain variations and modifications will be apparent to those of ordinary skill in the art upon reading this disclosure. Thus, for example, it is understood that the order of addition to the various components and ingredients disclosed herein can be varied without substantially affecting the properties of the resulting product. By way of illustration, the addition of silicon to the other admixed ingredients is disclosed as the last step of the process of the invention in order to facilitate premixing most of the ingredients at a central plant location and thereafter adding the silicon to initiate foaming at the use site.

According to another variation of the subject invention, mineral foam compositions can also be made without the use of the aqueous sodium silicate. In this case, however, the setting process is significantly retarded, and the resulting product may lack the cohesiveness and bonding characteristics that are desirable where the intended use is, for example, to coat wall panels or the metal structural members of buildings.

According to yet another variation of the subject invention, it is understood that fiberglass can also be incorporated into the disclosed mineral foam compositions. When fiberglass is employed in the compositions, it becomes possible to cast long beams and horizontal panels without sagging. Particularly good results have been achieved by admixing into the compositions about 0.05 kilograms of chopped fiberglass per kilogram of silicon. In this case the resulting product had a density of about 22 pounds per cubic foot, a compressive strength of about 66 pounds per square inch, and a tensile strength of about 50 pounds per square inch.

While the invention has been described in relation to its preferred embodiments, it is intended that the scope of the invention be limited only by the appended claims.

I claim:

1. A mineral foam composition consisting essentially of a dilute aqueous solution of sodium silicate having a specific gravity ranging from about 10° to about 40° Be.; from about 0.01 to about 0.1 kilograms alkali metal hydroxide per liter of dilute aqueous sodium silicate solution; from about 1 to about 3.3 kilograms of filler material per liter of dilute aqueous sodium silicate solution having the alkali metal hydroxide solubilized therein; and silicon in an amount such that the ratio of silicon to filler material ranges from about 1:50 to 1:10 by weight.

2. The composition of claim 1 wherein the specific gravity of said dilute aqueous solution of sodium silicate ranges from about 20° to about 25° Be.

3. The composition of claim 1 wherein said alkali metal hydroxide is selected from the group consisting of sodium hydroxide and potassium hydroxide.

4. The composition of claim 1 wherein said filler material has a calcium oxide content ranging up to about 30 percent by weight.

5. The composition of claim 1 wherein said filler material is selected from the group consisting of fly ash, pozzolan, and mixtures thereof.

6. The composition of claim 4 or claim 5 wherein said filler material is fly ash.

7. The composition of claim 1, further comprising fiberglass.

8. The composition of claim 7 wherein the ratio of fiberglass to silicon is about 1:20 by weight.

9. A process for making mineral foam compositions comprising the steps of diluting liquid sodium silicate to a gravity ranging from about 10 to about 40° Be.; solubilizing an alkali metal hydroxide in the diluted sodium silicate solution; thoroughly admixing a filler material therewith to form a substantially uniform thickened fluid; admixing silicon with the thickened fluid thus formed to initiate foaming; distributing the foaming thickened fluid at the point of use; and thereafter permitting the foaming thickened fluid to expand and set into a hardened mineral foam composition.

10. The process of claim 9 wherein said liquid sodium silicate is diluted to a specific gravity ranging from about 20° to about 25° Be.

11. The process of claim 9 wherein said alkali metal hydroxide is selected from the group consisting of sodium hydroxide and potassium hydroxide.

12. The process of claim 9 wherein said alkali metal hydroxide is solubilized in an amount ranging from about 0.01 to about 0.1 kilograms per liter of dilute aqueous sodium silicate solution.

13. The process of claim 9 wherein said filler material has a calcium oxide content ranging from about 10 to about 30 percent by weight.

14. The process of claim 9 wherein said filler material is selected from the group consisting of fly ash, pozzolan, and mixtures thereof.

15. The process of claim 14 wherein said filler material is fly ash.

16. The process of claim 9 wherein said filler material is present in an amount ranging from about 1 to about 3:3 kilograms per liter of dilute aqueous sodium silicate solution having the alkali metal hydroxide solubilized therein.

17. The process of claim 9 wherein the ratio of silicon to filler material ranges from about 1:50 to about 1:10 by weight.

18. The process of claim 9, further comprising the step of admixing fiberglass with said thickened fluid prior to distributing said fluid at the point of use.

* * * * *

UNITED STATES PATENT AND TRADEMARK OFFICE
CERTIFICATE OF CORRECTION

PATENT NO. : 4,328,034
DATED : May 4, 1982
INVENTOR(S) : Charles N. Ferguson

It is certified that error appears in the above-identified patent and that said Letters Patent are hereby corrected as shown below:

Column 4, line 13, after "oxide" insert -- alone --; and

Column 4, line 55, delete "foam" and insert -- form --.

Signed and Sealed this

Twenty-seventh Day of July 1982

[SEAL]

Attest:

*Attesting Officer*

GERALD J. MOSSINGHOFF
*Commissioner of Patents and Trademarks*